United States Patent [19]

Vofsi et al.

[11] Patent Number: 4,478,770
[45] Date of Patent: Oct. 23, 1984

[54] PRODUCTION OF CONTACT LENSES

[75] Inventors: David Vofsi; Shymon Reich; Israel Tchoukran, all of Rehovot, Israel; Joaquin Mayoral, Caracas, Venezuela

[73] Assignee: Yeda Research and Development Company, Ltd., Rehovot, Ill.X

[21] Appl. No.: 378,655

[22] Filed: May 17, 1982

[30] Foreign Application Priority Data

May 18, 1981 [IL] Israel ........................................ 62899

[51] Int. Cl.$^3$ .............................................. B29D 11/00
[52] U.S. Cl. ........................................ 264/2.1; 264/2.6; 264/2.7; 425/272; 425/275; 425/429; 425/808
[58] Field of Search ................... 264/1.1, 1.5, 2.1, 301, 264/DIG. 51, 2.2, 2.5, 2.7, 2.6; 425/808, 269, 270, 272, 275, 429

[56] References Cited

U.S. PATENT DOCUMENTS

| | | | |
|---|---|---|---|
| 2,206,797 | 7/1940 | Williams | 425/808 |
| 2,330,837 | 10/1943 | Mullen | 425/808 |
| 3,002,231 | 10/1961 | Walker et al. | 264/DIG. 51 |
| 3,030,859 | 4/1962 | Elliott, Jr. | 264/1.1 |
| 3,093,447 | 6/1963 | Crandon | 425/808 |
| 3,361,858 | 1/1968 | Wichterle | 425/808 |
| 3,380,718 | 4/1968 | Neefe | 264/2.2 |
| 3,822,089 | 7/1974 | Wichterle | 264/2.1 |
| 3,871,813 | 3/1975 | Cappeli | 425/808 |
| 4,017,238 | 4/1977 | Robinson | 425/808 |
| 4,067,937 | 1/1978 | Unno et al. | 264/1.5 |
| 4,118,270 | 10/1978 | Pan et al. | 264/1.5 |
| 4,155,962 | 5/1979 | Neefe | 264/2.5 |
| 4,159,292 | 6/1979 | Neefe | 264/215 |
| 4,231,905 | 11/1980 | Neefe | |
| 4,239,712 | 12/1980 | Neefe | 264/2.2 |
| 4,247,492 | 1/1981 | Neefe | 264/2.3 |
| 4,284,591 | 8/1981 | Neefe | 264/111 |

*Primary Examiner*—James B. Lowe
*Attorney, Agent, or Firm*—Ladas & Parry

[57] ABSTRACT

The invention relates to a process for the production of a contact lens, which comprises coating a tool made of an inert material, having a curvature corresponding to that of one of the optical surfaces of the lens to be produced, with a layer of solid polymer, and machining the outer surface of said polymer to the desired curvature of the second surface of said lens while supported by said tool, and to a tool for carrying out such process.

8 Claims, 6 Drawing Figures

POLYMER SOLUTION

PRODUCTION OF CONTACT LENSES

FIELD OF THE INVENTION

The invention relates to the production of contact lenses. There is provided a simple process for the production of such lenses, wherein the mechanical machining to the final shape is simplified. There is also provided equipment for carrying out this process of manufacture.

BACKGROUND OF THE INVENTION

Contact lenses are divided into two main classes: hard lenses and soft lenses, or so called "hydrogel" lenses. Each of these has advantages and disadvantages. The main advantage of a hard lens, such as the one made for instance from cellulose acetate butyrate (CAB) or from polymethyl-methacrylate (PMMA) is its mechanical strength and dimensional stability. A disadvantage is that they are rather uncomfortable to wear. A soft lens made of water swellable polymers, is more comfortable to wear, but becomes oxygen permeable only at a rather high water content which, however, also causes a drastic decrease in its mechanical strength (tear strength).

Both these types can be manufactured by various methods, one important method comprising the following steps:

(a) The material is first prepared in the form of a solid rod and cut up into small discs.

(b) These discs are then machined on a lathe to basically predetermined dimensions, both on the convex and concave surfaces.

(c) Both surfaces are then polished to the final prescribed dimensions.

(d) In the event of a hydrogel type lens, the finally machined and polished lens is equilibrated with a saline solution of a specified salt concentration whereby it assumes its final shape, being ready to wear. On the other hand, the hard lens usually absorbs only very minor amounts of water and is ready to wear following the polishing operation.

While these two types dominate the market of contact lenses at the present time, there exist several variations of these two classes. For example, a hard lens may be made more comfortable to wear by grafting onto its surface a very thin film of of a hydrophilic monomer or otherwise by hydrolyzing its surface. In this way, the advantages of the hard lenses are combined with the tissue tolerance of a hydrogel-type lens.

According to conventional practice of contact lens manufacture, the lens is mechanically machined (cut and polished) starting with a fully polymerized material in the form of a small cylinder. After having machined and polished one of the lens surfaces, the semi-finished lens is attached to a tool, usually by means of a low-melting wax, and carefully centered so that its axis coincides exactly with that of the lathe. Any misalignment of the lens and the machine axis will cause an optical fault in the lens. This is a laborious and time consuming step in the manufacture of the lens.

This step is reportedly eliminated by using a technique known as "centrifugal casting" or by employing matched die molding methods. According to these technologies, the two axes in a lens are automatically coincident, and no misalignment can take place.

These methods require costly tooling, which is justified only for large scale production. These methods are not generally applicable to the various materials that are being used in lens manufacture. For example, the matched die molding technique may be used only with thermoplastic resins, such as CAB (Cellulose Acetate Butyrate), but not with cross-linked polymers, such as the soft lenses made of crosslinked polyHEMA.

Another method is described in U.S. Pat. No. 4,155,962. According to this method, a thermosetting casting resin is cast into a cup-like mold, preformed by means of a master mold, from a thermoplastic resin by injection molding. It is claimed that the posterior surface of the lens is formed by replicating the surface of the plastic cup-like mold. However, it is clear that the plastic cup itself cannot be exactly multiplicated by an injection molding process, due to shrinkage of the plastic material in the cooling step which is of a stochastic, uncontrollable nature. For producing a lens surface of optical quality these dimensional variations between the injection molded cups of said invention, cannot be tolerated.

Since a surface made of a thermoplastic resin is not inert towards a casting resin, the interaction of the casting resin with the preformed plastic cup-like mold may be of two opposing kinds: if it is slightly swelled by the casting resin—it will stick to the finished posterior surface of the semi-finished lens. This may be defined as a positive interaction. To eliminate such a possibility, said patent suggests the use of parting agents with which the cup-like mold should be coated prior to the casting operation. This not only introduces an additional operation, but also causes certain surface distortions, detrimental to the optical quality of the ultimate posterior lens surface.

In case of a "negative" interaction of the casting resin with the surface of the cup-like mold of said invention, which manifests itself by non-wetting of said surface, as for instance when a Teflon TM fluorocarbon resin cup is being used, the subsequent machining of the lens becomes impossible, since the slightest force of the cutting tool will cause separation between the molded lens precursor and the said cup.

U.S. Pat. No. 4,247,492 describes another embodiment of the plastic cup lens casting process, whereby the thermoplastic resin is subjected—during the injection molding of the cup—to high shear forces in order "to break-up macromolecular chains", thereby producing active species at the surface of the cup in order to improve the adhesion of the lens precursor to the cup surface, so as to avoid premature demolding of said lens precursor.

It is clear from these contradicting approaches to the lens-casting method in a plastic disposable cup-like mold, that the casting method is complicated and inefficient and can hardly be a viable alternative to conventional lens forming technology.

SUMMARY OF THE INVENTION

According to the present invention, there is provided a simple and convenient method for the manufacture of contact lenses, of the hard or soft type. According to one embodiment, a dipping operation in a polymer solution of a tool is used, which causes the perfect formation of the concave surface of the lens. Another embodiment relates to a hot-dipping process of such tool into a fluidized bed of polymer particles.

By using a tool of inert material, such as stainless steel or ceramic, problems of sticking or slipping of the lens precursor during the machining operation are avoided.

The perfect balance between adequate adhesion to the tool and ease of disengagement of the final lens from it, is achieved by coating the tool with a film of polymer solution, of the order of 200–500 um, and by setting the coating to a hard consistency by evaporating the volatile constituents of the dipping solution.

The method of the invention is applicable to polymeric materials that dissolve in a volatile solvent. It is adaptable to the production of hard or soft lenses.

Since no pressure is applied at any stage of the process—the lens material being held on the tool by a cohesive gripping force—the tool is not damaged during the operation, and may be used for practically endless surface runs, producing contact lenses with extreme posterior surface fidelity of optical quality.

According to another embodiment of the invention, a tool with convex surface, as described above, is preheated to a temperature above the melting temperature of a given polymer; polymer particles of the type to be used are fluidized by an inert gas; the preheated tool is dipped into said fluidized bed until its surface is coated with molten polymer of adequate thickness; the tool is withdrawn, quenched and the lens is machined as set out above.

BRIEF DESCRIPTION OF THE DRAWINGS

With reference to the accompanying drawings.

THE TOOL

A special tool has to be fabricated which has a spherical concave surface, precisely machined to the dimensions of the final convex surface of the contact lens to be manufactured. There will be provided a plurality of such tools, each designed to a prescribed base-curve for the lens to be produced.

The tool may be made of various materials, but particularly useful ones are stainless steel, chromium plated steel, ceramic materials, or highly polished quartz.

THE PROCESS

The process of manufacture according to this invention comprises the following steps:

(a) Preparation of the Dipping Solution

A solution having a specified predetermined viscosity of a polymeric material suitable for contact lens manufacture is prepared. Whenever a fully polymerized solid thermoplastic material suitable for contact lens manufacture is available, such as for instance CAB or poly-methyl methacrylate, it can be dissolved in a suitable volatile solvent in a concentration such as to attain the desired viscosity of the solution at room temperature.

In the case of a material such as poly-methyl methacrylate, the solid, fully polymerized material may be dissolved in monomeric methyl methacrylate to provide the viscous solution necessary for the following step. However, in this case, a polymerization catalyst and/or activator, or a photosensitizer may have to be added to the solution in order to effect the polymerization of the monomeric material, as is well known and being effected in dental practice.

An alternative for the preparation of the dipping solution is in the polymerization of a given monomer, such as for instance methyl-methacrylate, a copolymer of methyl-methacrylate, with ethyl or butyl-acrylate, or hydroxyethyl acrylate (HEMA) to a predetermined viscous consistencey known in the art as the "syrup". This may be achieved either by adding a polymerization catalyst and effecting the pre-polymerization at an elevated temperature, or by adding a photosensitizer and effecting the pre-polymerization by action of actinic light. In the event that the monomer is of a type ultimately produing a hydrogel, such as HEMA, an additional monomer has to be added to the thus obtained "syrup" before the next step can be effected, namely, the cross-linking monomer—which is usually ethyleneglycol-dimethacrylate (EDMA)—in a predetermined proportion, so as to cause the cross-linking of the partially polymerized HEMA after the dipping operation (step (c)). Additional catalyst and/or activator or photosensitizer may also have to be added to the "syrup" before the dipping operation in order to properly complete the polymerization of the material on the tool, as thereafter described. A procedure for production of cross-linked polyHEMA is detailed by M. Stol et al, J.Pol.Sci., Polymer Symposium 66, 221, 1979.

(b) The Dipping Operation

Figure 1:
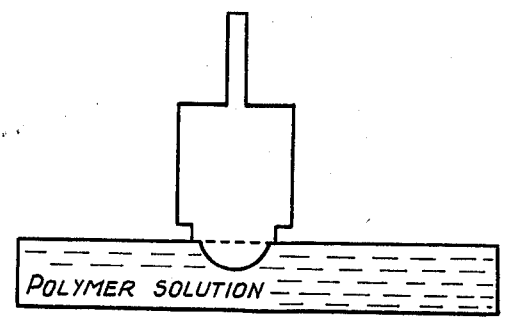
FIG. 1 illustrates in diagrammatic form the dipping operation according to the invention.

With the solution of the polymeric material ready for use, the tool is immersed therein to a depth so as to cover the "cutting edge" of the tool (FIG. 1). The tool is then slowly withdrawn from the dipping solution at a specified speed and in an upwards direction. After some of the material adhering to the tool may have dripped off, the coated tool is inverted by a 180° movement, whereby the adhering material is caused to slowly flow in a downward direction and more evenly distribute itself on the surface of the tool. The tool is then placed into a fixture of a device, capable of causing a planetary movement of the tool, i.e. a movement around the main axis of the tool and simultaneously a rotational movement around an axis, perpendicular to this main axis. The speeds of rotation around these axes are adjustable, and will depend on the viscosity of the dipping mixture and its rheological behavior.

Figure 2:
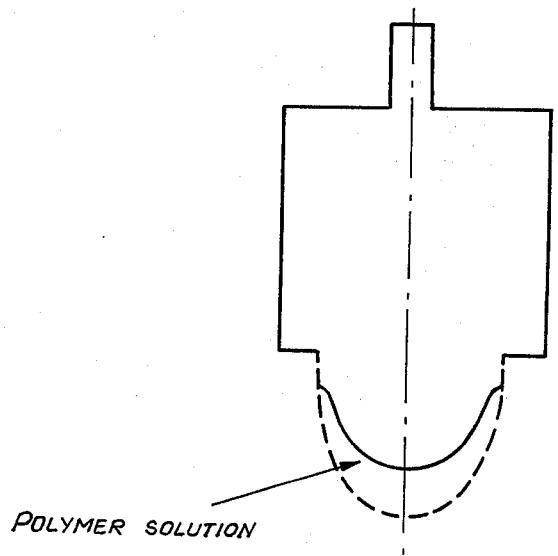
FIG. 2 illustrates the hanging chain profile of lens material adhering to the tool according to the invention.

It is desirable for the success of the process, that during this stage, the material adhering to the tool, and forming a coating thereon should reach a consistency such as to finally form the so-called "hanging chain profile" when the tool is pointing downwards. This profile is characteristic of the line a chain is assuming when fixed with its two ends over a distance smaller than its extended length, and left to adjust itself by gravity. This is shown in FIG. 2.

(c) Setting of the Polymer

During this stage of the process, the polymeric coating on the tool is caused to set, either by essentially complete removal of non-reactive solvent, in which the original polymer was dissolved, or essentially complete polymerization of any reactive monomers present in the dipping mixture (step (a)). This may be accomplished by elevating the temperature so as to speed up vaporization of solvent, or cause the polymerization, catalytic or purely thermal, of any reactive monomer present in the coating. Clearly, in the case of a rather volative monomer, some of it may also evaporate from the coating during this stage.

When a reactive monomer comprises a part of the dipping mixture (step (a)), it may be caused to polymerize also by the action of actinic light, as is well known in the art. In this case, the adhering coating on the tool is irradiated by light of a suitable wave-length, whereby photo-polymerization of the reactive monomer is effected at room temperature. Electron beam, or nuclear irradiation, may likewise cause complete polymerization of any monomer present in the coating. The use of radiation—u.v. or harder radiation—may also cause some cross-linking of the polymeric coating, which is desirable in some cases.

In any case, during this stage, essentially complete devolatilization either by vaporization or polymerization or a combination of both, is to be achieved.

(d) Annealing

It is well known that during the processing of a polymeric material, or indeed, during the polymerization process itself, certain internal stresses may be left in the formed object. Such stresses may also be present in a thick polymeric coating as formed in step (c). Stresses, if present, may cause optical distortion in the final lens, and should be removed. Removal of residual stresses in polymeric objects, such stresses being easily detectable by the use of polarized light—is rather easily achieved by thermal annealing. It is the objective of step (d) to eliminate any such stresses whenever present in the coating. The coated tool is heated to a temperature slightly above the glass-transition temperature of the polymer forming the coating, and then subjected to a gradual cooling to room temperature, as is being practiced in the art.

(e) Cutting, Grinding, Polishing

After the annealing, the tool is attached to the proper fixture on the cutting lathe and the outer surface of the coating is machined to the predesigned dimensions, as is the practice in contact lens manufacture.

Machining, e.g. lathe-cutting, grinding and final polishing, is effected on the outer surface of the coating adhering to the tool, following the annealing operation. This also applies to water absorbing systems, such as for instance polyHEMA-EDMA, whenever the hydration process is carried out after demolding the lens from the tool (step (f)).

(f) Demolding from the Tool

Having completed the machining of the outer surface of the coating, in the conventional manner, formation of the lens is complete, and it is ready for demolding. To effect the demolding of the lens, a proper cutting tool is applied to the coated material while the tool is being spinned on the machine so as to effect proper "edging" of the lens and finally, cut off from the tool at the desired lens diameter, and cause demolding.

It will be evident to those versed in the art that the steps (a) to (e) may be easily organized in a sequence of operations, after each other, fully or partly automated, and the present invention is not limited to the details as enumerated in the foregoing steps, or the exact mode of their execution. The advantages of the present method, as compared to the existing methods, will become apparent from the following Examples to which, however, the invention is by no means limited.

DESCRIPTION OF THE PREFERRED EMBODIMENT

Example 1

A solution containing 68% W/W of poly-methyl-methacrylate (I.C.I. Diakon injection grade resin) in ophthalmic grade methyl-methacrylate monomer was prepared. The solution viscosity determined by means of a Haake viscosimeter equipped with a PK-1 rotatory bob yielded a value of 35000 cps at 20±1° C.

The tool was dipped into this concentrated solution for 30 seconds and then the excess polymer solution was allowed to drip off by lowering the tray containing the solution. The tool was then placed into the fixture of a device that caused it to rotate in a planetary motion. The rotational speed around its axis was 16 rpm and perpendicular to its axis—the speed was 12 rpm. This motion allows the polymer solution to distribute itself evenly on the surface of the tool, maintaining a thickness gradient with a maximum at the tool apex.

The planetary rotation device is enclosed in a cabinet, and is driven from the outside by a constant speed motor. This allows us to maintain dust free conditions during lens setting. The polymer is set after 2.5 hours at an ambient temperature of 26.5° C., after which the temperature inside the cabinet is raised to 80° C. and the rotation is discontinued. Under these conditions, the coated tool is kept for 8 hours with the purpose of evaporating any trace of solvent which may have remained; finally, the tool is allowed to cool down to room temperature.

The tool is then dismounted from the fixture on the rotational device and the film thickness is determined. We find that using this procedure film thicknesses are obtained in the range of 300–350 microns at the apex of the tool.

The dismounted tool is then placed (without losing its centricity) on the cutting lathe and further on the polishing device where additional operations are performed according to the usual procedures in conventional contact lens technology.

The lens is then removed (demolded) from the mold by cutting the periphery of the film, using a circular knife, and the edging operations are performed in a conventional manner.

No trace of monomer is found in the final lenses as determined by the gas chromatographic analysis of the solution obtained by dissolving the lenses in tetrahydrofuran using ethyl benzene as an internal standard.

Example 2

Hard Lens Manufacturing Process 4 grams of cellulose acetate butyrate (Eastman Kodak) were dissolved in a mixture of solvents having the following composition:

Ethyl acetate 8%
Butyl acetate 20%
Ethyl alcohol 16%
Butyl alcohol 8%
Toluene 48%

All percentages are by volume. The solution has a viscosity of 40000 cps at 20° C. The dipping and subsequent operations were identical with those of the previous Example.

The thickness of the film at the apex of the tool was about 300 micron. As in the previous case, we did not detect any traces of residual solvent in the polymer films after dissolving the lenses in ethyl benzene marked with tetrahydrofuran and injecting the solution into an XE 60 containing Gas Chromatography column at 60° C.

The operations of cutting, polishing and edging the external surface of the lens are performed to produce the optical dimensions desired by transferring the tool to the appropriate devices without altering the centricity of the lens on the mold.

Example 3

Soft Lens Manufacturing Process

A 30% solution of ophthalmic grade hydroxyethylmethacrylate (HEMA) in 2-propanol was polymerized at 90° C. using benzoyl peroxide as an initiator. After one hour the polymerization was stopped by rapid cooling of the polymer solution.

Thereafter the polymer solution was concentrated by extracting part of the alcohol using vacuum. The final viscosity was adjusted by the addition of monomer (HEMA). After 2% HEMA was added to the polymer solution, the viscosity as determined in a Haake viscosimeter equipped with a PK-1 rotatory bob at 20±1° C., was 45000 cps.

The coating of the film on the tool was performed at room temperature following the same procedure as in Example 1. After the film acquires homogeneous distribution by means of the planetary motion of the tool, the temperature of the cabinet is set to 60° C. and the isopropanol solvent is evaporated while the HEMA is being polymerized. For this operation, the cabinet is filled with argon to prevent polymer degradation.

After 10 hours, the tool is cooled down and removed from the cabinet and the additional operations on the lathe and on the polishing arrangements can be performed. The film thickness at the apex of the mold was found to be 280 microns.

Machining and polishing are performed on the film before it is equilibrated with saline solution.

The lenses thus obtained were swollen in a 2% NaCl solution and after a period of 48 hours they acquire the consistency of a clear hydrogel. No trace of monomer was found in the final lenses as determined by gas chromatography analysis of the solution obtained by dissolving the lenses in tetrahydrofuran using ethylbenzene as an internal standard.

Example 4

Melt Coating of the Tool

Cellulose acetate-butyrate resin particles (Eastman Kodak) were ground and graded to a particle size ranging in average diameter (defined by sieve openings) of between 0.20 and 0.25 mm. The particles were fluidized by means of a stream of nitrogen gas in a cylindrical glass funnel provided with a fritted glass bottom, permeable to the fluidizing gas but impermeable to the resin particles. The nitrogen stream was adjusted by means of a needle valve in a manner such, that the level of the fluidized particle bed just reached the top of the funnel, without any of them spilling over the rim.

The tool to be coated was preheated, by means of an electrical heating unit attached to it, to a temperature about 330° C. above the melting point of the resin (280° C.). It is then placed in the fluidized bed at the top of the funnel so that its convex surface is completely covered by a clear, uniform molten polymer film of between 0.3–0.4 mm (as measured subsequently). At this point the tool is quickly detached from the electrical heating unit and quenched in water.

The subsequent cutting, polishing and edging operation of the lens precursor material to the final product is effected in a manner similar to that described in Examples 1 and 2.

We claim:

1. A process for production of a contact lens, comprising coating a tool made of an inert material and having a curvature corresponding to that of a first of two optical surfaces of the lens to be produced with a composition comprising a polymer suitable for contact lens manufacture, said process comprising the steps of immersing the tool in a solution of the polymer, withdrawing the tool, removing solvent so as to leave a solid layer as a coating of adequate thickness and then inverting the tool by 180° and subjecting it to planetary motion until the polymer is set and annealing said layer, said layer having an inner surface with a curvature corresponding to that of said tool and an outer surface, and machining said outer surface of said layer to desired dimensions while supported by said tool to form the second optical surface of said lens.

2. A process according to claim 1, wherein said lens has a diameter of between about 7 and 10 mm and a thickness at its apex between about 50 and 250 microns.

3. A process according to claim 1, wherein the polymer is selected from the group consisting of poly-methyl-methacrylate, cellulose acetate-butyrate, hydroxyethyl-acrylate and copolymers of hydroxyethyl-acrylate.

4. A method as defined in claim 1, further comprising cutting said solid layer while said tool is spinned to form an edge of said lens.

5. A method as defined in claim 1, further comprising cutting said solid layer while said tool is spinned to form an edge of said lens.

6. A process for the production of a contact lens, comprising coating a tool made of an inert material and having a curvature corresponding to that of a first of two optical surfaces of the lens to be produced with a composition comprising a polymer suitable for contact lens manufacture, said process comprising the steps of heating the tool to a temperature above the melting point of the polymer, dipping the tool into a fluidized bed of particles of said polymer until said tool is coated by a layer of molten polymer of adequate thickness, withdrawing the tool and layer of molten polymer, quenching said layer of molten polymer to form a solid layer, said layer having an inner surface with curvature corresponding to that of said tool and an outer surface, and machining said outer surface of said layer to desired dimensions while supported by said tool to form the second optical surface of said lens.

7. A process according to claim 6, wherein the polymer is cellulose acetate-butyrate.

8. An apparatus for the production of contact lenses comprising a tool with a convex surface corresponding to a concave surface of a contact lens to be formed, said tool being made of an inert material and having a surface of optical quality, mechanical means operable for immersing said tool into a dipping solution, mechanical means operable for withdrawing said tool from said dipping solution, mechanical means for inverting said tool after coating by dipping, mechanical means for imparting to said tool a planetary motion around the main axis of said tool, and mechanical means for simultaneously imparting a rotational motion around an axis perpendicular to said main axis.

* * * * *